US012574827B2

(12) United States Patent (10) Patent No.: US 12,574,827 B2
Pazhyannur et al. (45) Date of Patent: Mar. 10, 2026

(54) DEPLOYMENT OF PROFILES FOR ACCESS TO WIRELESS NETWORKS

(71) Applicant: Ruckus IP Holdings LLC, Claremont, NC (US)

(72) Inventors: Rajesh Pazhyannur, Fremont, CA (US); Christopher Mohammed, Whitby (CA)

(73) Assignee: Ruckus IP Holdings LLC, Horsham, PA (US)

( * ) Notice: Subject to any disclaimer, the term of this patent is extended or adjusted under 35 U.S.C. 154(b) by 404 days.

(21) Appl. No.: 18/142,637

(22) Filed: May 3, 2023

(65) Prior Publication Data

US 2023/0362788 A1 Nov. 9, 2023

Related U.S. Application Data

(60) Provisional application No. 63/338,133, filed on May 4, 2022.

(51) Int. Cl.
| | |
|---|---|
| *H04L 67/303* | (2022.01) |
| *H04W 48/02* | (2009.01) |
| *H04W 48/08* | (2009.01) |
| *H04W 76/15* | (2018.01) |

(52) U.S. Cl.
CPC ........... *H04W 48/02* (2013.01); *H04L 67/303* (2013.01); *H04W 48/08* (2013.01); *H04W 76/15* (2018.02)

(58) Field of Classification Search
CPC ..... H04W 48/02; H04W 76/15; H04W 48/08; H04W 12/08; H04W 12/12; H04W 28/16; H04W 76/00; H04L 67/303; H04L 67/306
See application file for complete search history.

(56) References Cited

U.S. PATENT DOCUMENTS

| | | | | |
|---|---|---|---|---|
| 2008/0275979 A1* | 11/2008 | Saba | ...................... | G06Q 10/06 709/223 |
| 2009/0157497 A1* | 6/2009 | Fusz | ...................... | G06Q 30/02 705/14.56 |
| 2009/0215469 A1* | 8/2009 | Fisher | ................... | H04L 67/306 455/456.3 |
| 2013/0024516 A1* | 1/2013 | Blinder | ................. | G06Q 50/01 709/204 |
| 2013/0173702 A1* | 7/2013 | Lang | ...................... | H04W 12/08 709/204 |

(Continued)

*Primary Examiner* — Mewale A Ambaye

(74) *Attorney, Agent, or Firm* — Myers Bigel, P.A.

(57) ABSTRACT

Provided are devices, methods, and systems for generating and deploying networking profiles for enabling computing devices to connect to wireless networks in a secure manner. For example, a method may include: receiving a request for a networking profile from a second computing device, the networking profile configured to enable the second computing device to access to a wireless network; generating, based on the received request for the networking profile, a code for presentation; transmitting the code for presentation to the second computing device; receiving an indication of a content of the code for presentation from a first computing device different than the second computing device; generating the networking profile based on receiving the indication of the content of the code for presentation; and transmitting the generated networking profile to the second computing device.

20 Claims, 16 Drawing Sheets

(56) References Cited

U.S. PATENT DOCUMENTS

| 2016/0043962 | A1* | 2/2016 | Kim | H04W 4/80 |
| | | | | 709/224 |
| 2018/0032997 | A1* | 2/2018 | Gordon | G06Q 30/0269 |
| 2018/0146334 | A1* | 5/2018 | Wootton | H04L 67/54 |
| 2022/0122191 | A1* | 4/2022 | Boksha | G06Q 50/01 |

* cited by examiner

DEPLOYMENT OF PROFILES FOR ACCESS TO WIRELESS NETWORKS

CROSS-REFERENCE TO RELATED APPLICATION

The present application claims the benefit of priority to U.S. Provisional Application No. 63/338,133, filed on May 4, 2022, and the entire contents of the above-identified application are incorporated by reference as if set forth herein.

TECHNICAL FIELD

Aspects of the present disclosure relate to wireless networks, and more particularly, relate to deployment of profiles for access to wireless networks.

BACKGROUND

A wireless local area network ("WLAN") refers to a network that operates in a limited area (e g., within a home, school, store, campus, shopping mall, etc.) that interconnects two or more electronic devices using wireless radio frequency ("RF") communications. Electronic devices belonging to users of a WLAN, such as smartphones, computers, tablets, printers, appliances, televisions, lab equipment and the like (herein "client devices"), can communicate with each other over the WLAN. Since wireless communications are used, the client devices can move throughout the area covered by the WLAN (e.g., as the users of the client devices move) and remain connected to the network. Most WLANs operate under a family of standards promulgated by the Institute of Electrical and Electronics Engineers ("IEEE") that are referred to as the IEEE 802.11 standards. WLANs operating under the IEEE 802.11 family of standards are commonly referred to as WiFi networks. Client devices that include a networking subsystem that includes a WiFi network interface can communicate over WiFi networks.

A WiFi network includes one or more access points (also referred to as hotspots) that are typically installed at fixed locations throughout the area covered by the WiFi network. The WiFi network can include a single access point that provides coverage in a very limited area or may include tens, hundreds or even thousands of access points that provide in-building and/or outdoor coverage to a large campus or region. Client devices communicate with each other and/or with wired devices that are connected to the WiFi network through the access points. The access points may be connected to each other and/or to one or more controllers through wired and/or wireless connections. The WiFi network typically includes one or more gateways that may be used to provide Internet access to the client devices.

Many individuals use private WiFi networks both at home and at work. These private WiFi networks are typically secured from unauthorized access through password or other techniques for controlling access to the network, and the networks typically employ security settings, such as encryption, to protect confidential information being transmitted via the network.

Public WiFi networks are also common, such as WiFi networks provided in retail stores, coffee shops, restaurants, libraries, hotels, airports, and other establishments. These public WiFi networks are typically available for use by individuals (and their devices) that are temporarily visiting the establishment These public WiFi networks may be provided free of charge to all individuals, free to a limited subset of individuals (e.g., customers of the establishment), and/or on a paid subscription or hourly rate basis, with access to network resources (e.g., the Internet) managed by one or more controllers and/or one or more network gateway devices.

Many individuals that use network-enabled devices are unfamiliar and/or uncomfortable with manipulating the configuration settings for the WiFi network. At the same time, many businesses (especially small businesses) may not employ dedicated information technology staff that are always available during normal business hours at each location, and the employees of such business may be unfamiliar and/or uncomfortable with network administration. Accordingly, these businesses may operate their public WiFi networks in an unsecured or "open" fashion, either by design or by happenstance. Although open and unsecured WiFi networks are relatively easy to join, this results in an unsafe user experience, as unencrypted network traffic transmitted via the network may be relatively easily examined by unintended parties.

Some managed WiFi networks may use a captive portal or other technique where individuals can provide information shortly after connecting to a WiFi network and before being granted broader access to network resources. Captive portals may be used to obtain authentication, payment, acceptance of a license agreement or a policy agreement (e.g., acceptable use policy) and/or other functionality when onboarding client devices onto the wireless network. Captive portals typically require a web browser or other user interface that enable the user to acknowledge the connection details and/or provide information. Captive portals can be more user-friendly for initial onboarding of some client devices, but present their own problems and challenges. First, captive portals require increased administrative overhead and management. Second, not all devices (e.g., gaming consoles, smartwatches, streaming media devices, Internet-of-Things (IoT) devices) are capable of rendering or displaying the captive portal Third, privacy concerns have led to equipment vendors introducing Media Access Control (MAC) address randomization, which can disrupt the ability of a captive portal provider to recognize devices that repeatedly connect to a WiFi network.

To improve security, some public WiFi networks use one or more pre-shared keys or passwords. This can restrict some individuals (who lack the pre-shared key) from joining the network, although the degree of network security depends on whether the key is maintained in a relatively secret manner-if the key is learned by a malicious actor, the actor may be able to access the WiFi network and eavesdrop or snoop for unencrypted data. One solution is to provide dynamic pre-shared keys (DPSKs), in which each user gets a unique access code for WiFi network access by text message, email, printed voucher, or the like. Although DPSKs are secure, problems in selecting and configuring the correct wireless network remain.

Passpoint, sometimes referred to as HotSpot 2.0 and related to IEEE 802.11u, is intended to streamline WiFi network access and reduce or eliminate the need for users to find and authenticate a network each time they visit a public location. In an intended use case, a Passpoint-compatible access point (AP) can be deployed in the public location, and a Passpoint profile (also referred to as a certificate) can be installed on a Passpoint-compatible client device. Upon entering the coverage area serviced by the access point, the client device may obtain a list of available WiFi networks offered by the access point (e.g., from a beacon or other advertisement transmitted by the access point) and identify a wireless network that matches with the installed Passpoint profile. The client device may then automatically attempt to join the Passpoint-associated WiFi network and provide credentials associated with the Passpoint profile, such as a username/password or a security certificate. Advantageously, Passpoint profiles are not tied to a specific public location, access point, or WiFi network, and the same profile may be used to access a plurality of different WiFi networks offered at different locations. Additionally, Passpoint functionality offers greater connectivity between WiFi networks, cellular networks, and mobile devices, and WiFi networks secured by deployment and usage of Passpoint profiles may provide a significantly higher level of security than other wireless networks.

SUMMARY

The present disclosure provides systems, methods, and devices for increasing generation and distribution of networking profiles that are used to access wireless networks secured by usage of such networking profiles. In some of the provided systems, methods, and devices, a first client device of the user may be used in the generating and provisioning of a networking profile to a second client device of the user. Additionally or alternatively, in some of the provided systems, methods, and devices, an electronic presentation device may be used in the generating and provisioning of a networking profile to a first client device of a user. This may improve overall network security, reduce administrative overhead of managing wireless networks at a location, and/or increase customer satisfaction, as users may be able to access networking resources more easily and more securely according to the inventive concepts and examples of embodiments thereof provided herein. The present disclosure is not limited to the above objects and improvements, and other systems, methods, and devices may be disclosed herein.

Some embodiments of the present disclosure may provide methods, systems, and devices for deployment of profiles that provide access to wireless networks. For example, a method provided by the present disclosure may include: receiving a request for a networking profile from a second computing device, where the networking profile is configured to enable the second computing device to join a wireless network; generating, based on the received request for the networking profile, a code for presentation; transmitting the code for presentation to the second computing device; receiving an indication of a content of the code for presentation from a first computing device that is different than the second computing device; generating the networking profile based on the receiving of the indication of the content of the code for presentation; and transmitting the generated networking profile to the second computing device.

According to some aspects of the present disclosure, some methods provided may include receiving a user identifier; generating, based on the user identifier, a code for presentation by an electronic presentation device; transmitting the code for presentation to the electronic presentation device; receiving, from a first client device, a content of the code; generating, based on the receiving of the content of the code and based on the user identifier, a networking profile for the first client device. The networking profile may be configured to enable the first client device to join a wireless network. The method may further include transmitting the networking profile to the first client device.

Some embodiments of the present disclosure may provide further methods, which may include: receiving user input requesting installation of a networking profile, where the networking profile may be configured to secure access to a first wireless network. The method may include transmitting a request for the wireless networking profile via a second wireless network different from the first wireless network; receiving and presenting a code associated with the request for the networking profile; obtaining the networking profile; and using the networking profile to connect to the first wireless network.

BRIEF DESCRIPTION OF THE DRAWINGS

Like reference numerals refer to corresponding element throughout the drawings. Moreover, multiple instances of the same element may be designated by a common prefix separated from an instance number by a dash.

DETAILED DESCRIPTION

Figure 1:
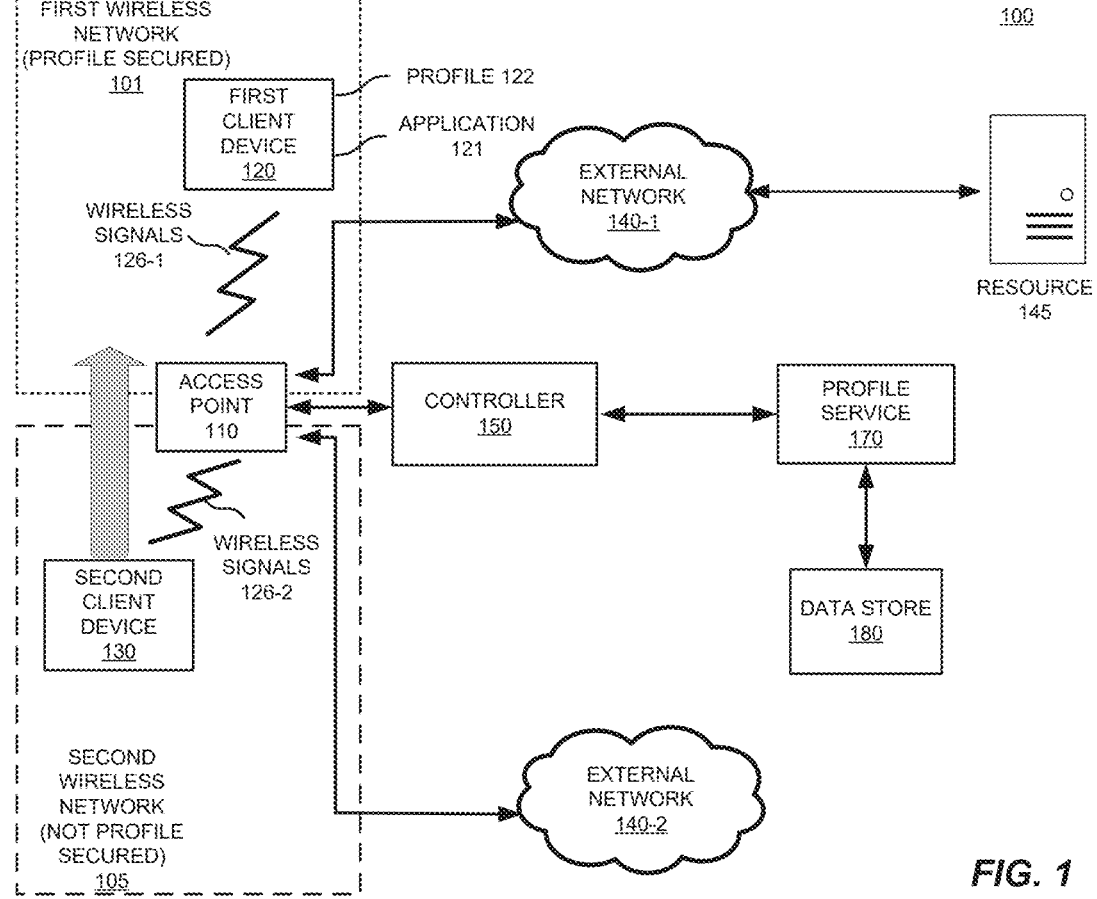
FIG. 1 is a block diagram illustrating an example of a networking system in which communication techniques according to aspects of the present disclosure may be implemented.

Although Passpoint provides the benefits discussed above, the present disclosure is based on a recognition that initially providing a profile to a client device may present challenges. For example, Passpoint supports providing a profile as part of an on-boarding processes for "new" devices to the network through e.g., online sign-up (OSU), but many users are unfamiliar with Passpoint and/or are reluctant to step through an OSU process or other process.

In an effort to increase usage of Passpoint profiles, some hospitality vendors, such as hotel chains and airport network operators, are bundling Passpoint profiles into mobile applications, such as loyalty program applications, that are offered by the vendor, such as through the APPLE IOS "app store" or the ANDROID "app store." In recent years, there has been significantly increased usage of mobile applications, especially in hotel and lodging hospitality, as these mobile applications may provide time-saving and/or social-distancing benefits to users, such as mobile check-in or digital room keys that enable the user to bypass the hotel front desk and head directly to their reserved room. By bundling a Passpoint profile within a mobile application, a vendor, such as a hospitality vendor, may be able to increase the number of smartphone and tablet-like devices that securely connect to the public wireless networks offered by the vendor. During an installation process of the mobile application, the Passpoint profile bundled therein may be associated with user-specific or device-specific information.

Many people carry multiple electronic devices while travelling. For example, business and personal travelers visiting a hotel or conference center may bring and use a smartphone, laptop computer, and even other network-enabled devices such as a smartwatch or video game system. Hospitality vendors typically do not provide software applications for installation on laptop computers and/or these other network-enabled devices, as the mobile applications are typically only written for and installable on smartphone and tablet-like devices. As such, there is not an opportunity for the hospitality vendor to bundle and thereby provide a Passpoint profile to individuals using these other networking devices.

As such, there has been limited success in getting laptop computers and other network-enabled devices (i.e., network devices other than smartphone and tablet-like devices) connected to Passpoint-based WiFi networks. Many hospitality vendors are therefore offering at least two wireless networks: a first wireless network that is secured by usage of deployed networking profiles (e.g., a Passpoint profile) that is used predominately by smartphone and tablet-like devices on which mobile applications can be installed; and a second wireless network that is not secured by usage of deployed networking profiles that is predominately used by laptops and other network devices, as well as smartphone and tablet-like devices that do not have a mobile application and/or a networking profile installed thereon.

The present disclosure provides systems, methods, and devices for increasing generation and distribution of networking profiles that are used to access wireless networks secured by usage of such networking profiles. In some of the provided systems, methods, and devices, a first client device of the user may be used in the generating and provisioning of a networking profile to a second client device of the user. Additionally or alternatively, in some of the provided systems, methods, and devices, an electronic presentation device may be used in the generating and provisioning of a networking profile to a first client device of a user. This may improve overall network security, reduce administrative overhead of managing wireless networks at a location, and/or increase customer satisfaction, as users may be able to access networking resources more easily and more securely according to the inventive concepts and examples of embodiments thereof provided herein.

FIG. 1 is a block diagram illustrating an example of a networking system 100 according to aspects of the present disclosure. As shown in FIG. 1, the networking system 100 may include an access point 110, a first client device 120, a second client device 130, a controller 150, a profile service 170, and a data store 180.

The access point 110 and the first client device 120 may communicate with each other via wireless communication, and the access point 110 and the second client device 130 may communicate with each other via wireless communication. The access point 110 may communicate with the first client device 120 and the second client device 130 using wireless communication that is compatible with an IEEE 802.11 standard. The wireless communication may occur in, for example, the 2.4 GHz frequency band, the 5 GHz frequency band, the 6 GHz frequency band, and/or the 60 GHz frequency band. However, other frequency bands may be used, and it will be appreciated that future versions of the IEEE 802.11 standards may operate in additional or different frequency bands.

The access point 110 may wirelessly communicate with the first client device and second client devices 120, 130 by: transmitting advertising frames on wireless channels, detecting one another by scanning wireless channels, exchanging subsequent data/management frames (such as association requests and responses) to establish a connection and configure security options (e.g., Internet Protocol Security), transmit and receive frames or packets via the connection, etc. As described further below with reference to FIG. 11, the access point 110, the first and second client devices 120, 130, and/or the controllers 150 may include subsystems, such as a networking subsystem, a memory subsystem and a processor subsystem. The networking subsystems may include one or more radios (not shown) that are used to wirelessly communicate with each other. For example, the access point 110 may include one or more radios (not shown) that are configured to transmit and receive signals in different frequency bands. Similarly, the client devices 120, 130 likewise may include one or more radios (not shown) that are configured to transmit and receive signals in some or all of the different frequency bands. As can be seen in FIG. 1, wireless signals 126-1 (represented by a jagged line) are transmitted between the first client device 120 and the access point 110. For example, some wireless signals are transmitted by the first client device 120 and received by the access point 110, and some wireless signals are transmitted by the access point 110 and received by the first client device 120. Similar wireless signals 126-2 (represented by a jagged line) are transmitted between the second client device 130 and the access point 110.

The access point 110 may establish and operate at least two wireless networks, which may include a first wireless network 101 to which access is secured by deployed networking profiles, such as a networking profile 122 installed on the first client device 120. The at least two wireless networks may also include a second wireless network 105 which is not secured by deployed networking profiles. For example, the second wireless network 105 may be an open (unsecured) network, or a network secured by one or more pre-shared keys (PSK). Herein, the term "not profile secured wireless network" or "NPS wireless network" encompasses both unsecured networks and secured networks that are secured using a mechanism other than deployed networking profiles. In contrast, the first wireless network 101 and other wireless networks that are profile-secured or secured using deployed networking profiles may be referred to herein as "profile secured wireless network" or "PS wireless network."

As seen in FIG. 1, and as described in greater detail below, the first client device 120 may be connected to the first wireless network 101, because the first client device 120 has the networking profile 122 installed thereon. The second client device 130 may be connected to the second wireless network 105, for example because the second client device 130 does not have a networking profile installed thereon. The access point 110 may facilitate communication between client devices connected the first wireless network 101, such as the first client device 120, and a first external network 140-1, which may comprise, for example, the Internet, an intra-net and/or one or more dedicated communication links. The access point 110 may also facilitate communication between the client devices connected to the second wireless network 105, such as the second client device 130, and a second external network 140-2, which may comprise, for example, the Internet, an intra-net and/or one or more dedicated communication links. In some embodiments, the first and second external networks 140-1 and 140-2 may be the same network. In some embodiments, at least one network resource 145 may be accessible via the first external network 140-1, but not accessible via the second external network 140-2. Accordingly, the first client device 120 may be able to access the network resource 145 via the first wireless network 101, while the second client device 130 may not be able to access the network resource 145 via the second wireless network 105. One example of the network resource 145 may be a router or other networking device that enables access to other networks, such as the Internet.

Although only one access point 110 is shown in FIG. 1, it will be appreciated that in some embodiments a plurality of access points 110 may be provided. In some embodiments, each of these access points 110 may provide local access (e.g., a wireless coverage area) to the first wireless network 101 and/or the second wireless network 105. It will be appreciated that some access points 110 may only be connected to a network (e.g., the first external network 140-1 or the second external network 140-2) through other access points 110 (e.g., in a mesh network implementation). The provided access points 110 may communicate with the controller 150 (discussed below) and the first and second external networks 140-1, 140-2 using wireless communications and/or using a wired communication protocol, such as a wired communication protocol that is compatible with an IEEE 802.3 standard (which is sometimes referred to as 'Ethernet'), e.g., an Ethernet II standard. The provided access points 110 may be physical access points, or may be virtual or 'software' access points that are implemented on a computer or other electronic device.

The first and second client devices 120 and 130 may be any of various user devices, such as smartphones, laptops, desktops, tablets, smartwatches, Internet-of-Things (IoT) devices, video game systems, or the like. Each of the first and second client devices 120 and 130 may be capable of accessing networking resources in a secured manner using deployed network profiles. For example, in some embodiments, the first client device 120 may be a smartphone or tablet-like device on which a mobile application 121 (e.g., APPLE IOS or ANDROID application) devices may be installed. The mobile application 121 may have bundled therein the networking profile 122 that may be used to access the first wireless network 101 that is secured by usage of deployed networking profiles. During an installation process or an operation of the mobile application 121, the networking profile 122 bundled therein may be associated with information specific to the first client device 120 and/or the user thereof (e.g., an account of the user).

The networking profile 122 may include information that is used by the first client device 120 to identify and connect to the first wireless network 101. The networking profile 122 may also include information that identifies the first client device 120 or the user thereof to the first wireless network 101, the access point 110, and/or the controller 150. The identification information may be used to authenticate the first client device 120 and/or the user thereof. In some embodiments, the networking profile 122 may be a Passpoint profile.

The controller 150 may be configured to control operations of the provided access points 110, and thereby also control operations of the first wireless network 101 and the second wireless network 105. The controller 150 may be configured to authenticate and/or authorize the first client device 120, the second client device 130, and/or a user thereof. The controller 150 may control access by the first and second network devices 120 and 130 (via the access point 110) to the external networks 140, and to network resources, such as the network resource 145 The controller 150 may be at the same location as the other components in networking system 100 or may be located remotely (e.g., a cloud-based controller 150). More than one controller 150 may be provided. In some embodiments, the controller 150 may be optional, and the functionality thereof described herein may be performed by one of the access points 110 of the networking system 100 or another device.

The controller 150 may be communicatively coupled to, or may include, a profile service 170. In some embodiments, the access points 110 may be communicatively coupled to the profile service 170, for example where the controller 150 is omitted. The profile service 170 may be configured to generate networking profiles and provide the generated networking profiles to client devices such as the first client device 120 and the second client device 130. In some embodiments, the profile service 170 may be communicatively coupled with a data store 180, which may provide user and/or guest information and may be maintained by an operator of the networking system 100 (e.g., a hospitality vendor). In some embodiments, the data store 180 may be associated with a loyalty service that may include servers or data stores that store information about users/guests and their loyalty status. In some embodiments, the data store 180 may be or may include a RADIUS server.

According to the present inventive concepts, components of the networking system 100 may facilitate the generation and deployment of a networking profile 122 for the second client device 130. The generation and deployment of the networking profile 122 to the second client device 130 may be performed using the first client device 120. Once the networking profile 122 is deployed to the second client device 130, the second client device 130 may be able to connect to the first (profile secured) wireless network 101, and thereby securely access the external network 140-2 and/or the resource 145. The components of the networking system 100 may also enable the linking of the networking profile 122 deployed on the first client device 120, and/or a user account associated therewith, with the generated networking profile 122 deployed to the second client device 130. This may enable the operator of the networking system 100 or other interested party to monitor and track network behavior of the first and second client devices 120 and 130, and/or the user thereof. In some embodiments, the linking of the networking profile may also permit the operator to confer a loyalty benefit to the second client device 130, such as increased bandwidth or networking speed, that is provided to members or higher-level members of a loyalty program offered by a hospitality vendor.

Figure 2A:
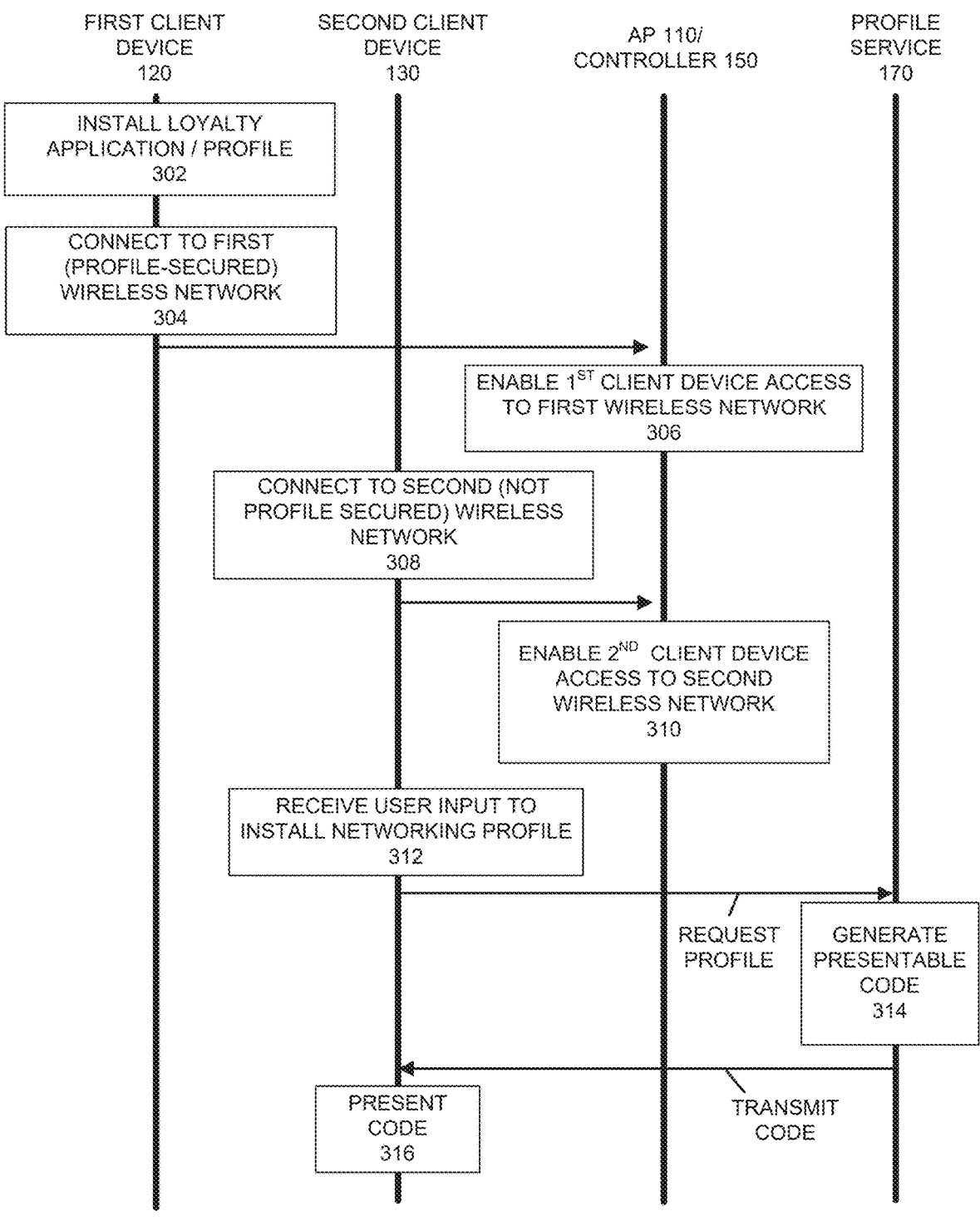
FIGS. 2A and 2B are diagrams illustrating operations and communications of the components of the networking system of FIG. 1 according to aspects of the present disclosure.
Figure 2B:
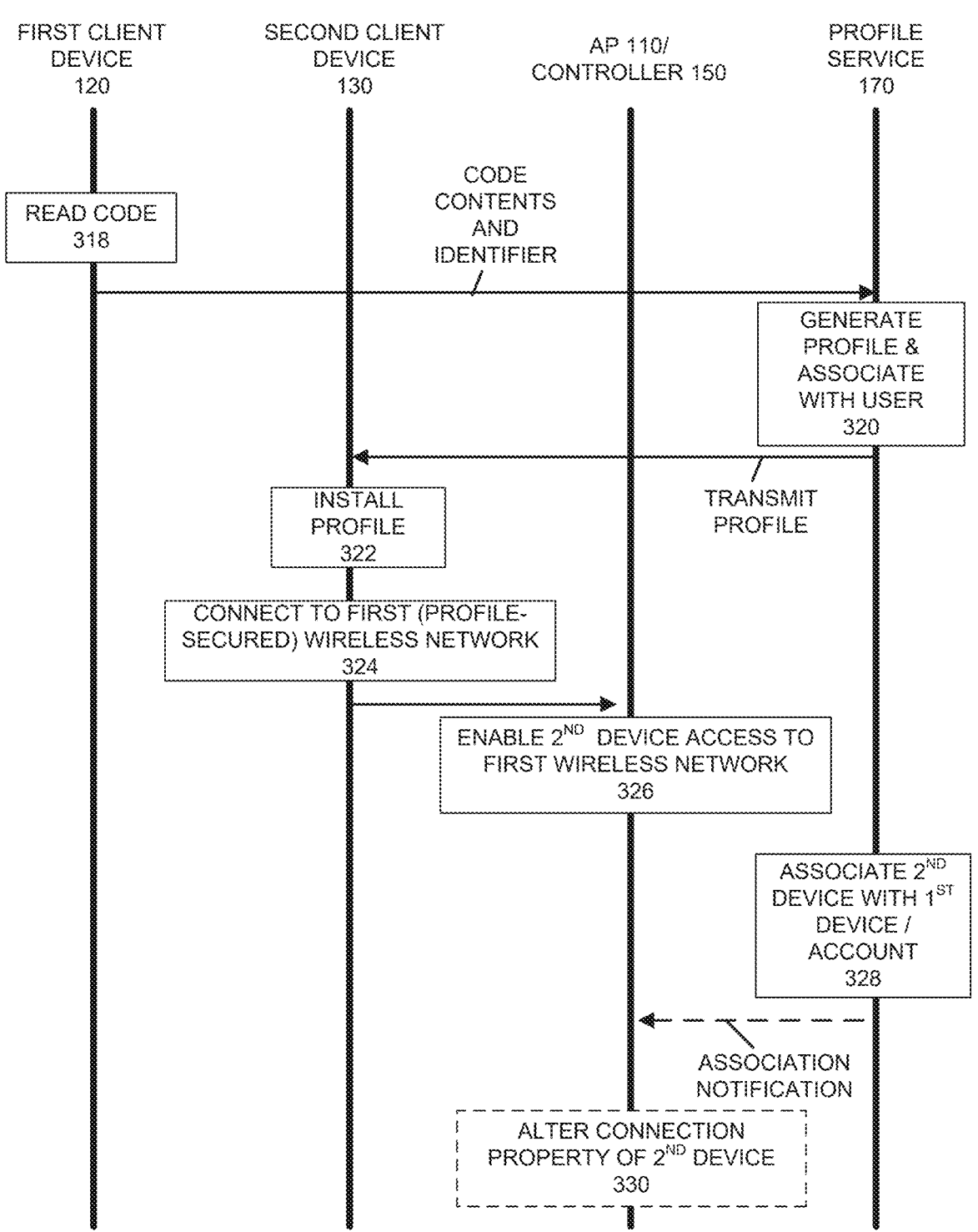

FIGS. 2A and 2B, are diagrams illustrating operations and communications of the components of the networking system 100 of FIG. 1 according to aspects of the present disclosure. In operation 302, a user may download and install onto the first client device 120 an application (e.g., a mobile application 121) that has bundled therewith a networking profile 122. The application may be, for example, a loyalty application. The installation and/or operation of the mobile application 121 by the first client device 120 may include the installation and/or configuration of the first client device 120 to use the networking profile 122 to discover and connect to a first wireless network 101. The first client device 120 may be a smartphone or tablet-like device. In some embodiments, operation 302 may be performed prior to the user visiting a location at which the first wireless network 101 is provided.

In operation 304, the first client device 120 may connect to the first wireless network 101. For example, the user may enter an area or location at which the first wireless network 101 is offered, and the access point 110 may advertise (e.g., by a beacon or other advertisement) the capability to connect using the networking profile 122 installed on the first client device 120. Using the networking profile 122, the first client device 120 may associate with the access point 110 and attempt to join the first wireless network 101. During the attempt to join the first wireless network 101, the first client device 120 may provide a credential, such as a security certificate or other information, that is associated with the networking profile 122. In operation 306, the access point 110 and/or the controller 150 may authenticate the provided credential, and if valid enable the first client device 120 to join the first wireless network 101.

Subsequently, in operation 308 the user may desire to access networking resources using the second client device 130. The second client device 130 may not have a networking profile 122 installed thereon. The user may configure or control the second client device 130 to associate with the access point 110 in an attempt to join the second (not profile secured) wireless network 105.

In operation 310, the access point 110 and/or the controller 150 may enable the second client device 130 to join the second wireless network 105. In some embodiments, this may include the access point 110 and/or controller 150 authenticating any pre-shared key or other access credential provided. Subsequent to operation 310, the first client device 120 may be connected to the first (profile secured) wireless network 101, and the second client device 130 may be connected to the second (not profile secured) wireless network 105.

In operation 312, the second client device 130 may receive user input from the user indicating that a networking profile 122 is to be installed thereon. For example, as a part of joining the second wireless network 105, user input requesting installation of a networking profile 122 may be solicited by way of a landing page or other user interface discussing the benefits of networking profiles and/or indicating that access to some networking resources will be permitted only via a profile secured wireless network (and hence, only if a networking profile 122 is installed). The user may decide that they would like access to the networking resources, and as such request installation of a networking profile 122.

In response to the user input, the second client device 130 may request a networking profile 122 from the access point 110 and/or the profile service 170. In operation 314, the profile service 170 may generate a code for presentation on a presentation device (e.g., a display device, an auditory device) associated with the second client device 130. For example, the code may be a machine-readable code, such as a one-dimensional or two-dimensional bar code or other code (e.g., Quick Response code or QR code) that is presentable by a display device of the second client device 130. The code may have embedded therein contents that uniquely identify to the profile service 170 the profile request transmitted by the second client device 130. In some embodiments, the code may be an alphanumeric code or other code (e.g., symbol, word sequence, auditory sequence) understandable and/or interpretable by the user.

The code contents and/or instructions to display or present the code contents may be transmitted to the second client device 130, which may display or present the code in operation 316. Turning now to FIG. 2B, in operation 318 the code contents may be read (or in some embodiments inputted by the user) into the first client device 120. For example, the first client device 120 may include a camera, microphone, keyboard, pointing device, touchscreen, or the like, and the first client device 120 may read the contents of the machine readable code. When the first client device 120 includes a camera, for example, the camera may be used to read the one-dimensional or two-dimensional bar code or QR code and obtain the contents thereof.

The first client device 120 may transmit to the profile service 170 the contents of the code, as well as one or more identifiers of a user or user account associated with the first client device. For example, the first client device 120 may transmit an account identifier of a user logged into the mobile application 121. The identifier may be obtained from the mobile application 121, the networking profile 122 installed on the first client device 120, and/or another data store on or associated with the first client device 120.

In operation 320, the profile service 170 may receive the user or account identifier and the code contents from the first client device 120, and using the code contents associate the user or account identifier with the profile request received from the second client device 130. The profile service 170 may use the user or account identifier to generate a networking profile for the second client device 130. In some embodiments, the profile service 170 may use the user or account identifier to obtain information from the data store 180. The profile service 170 may provide the generated networking profile to the second client device 130. For example, the profile service 170 may transmit the networking profile or a URL from which the networking profile may be obtained.

In operation 322, the second client device 130 may obtain and install the generated networking profile 122. In operation 324, the second client device 130 may disconnect from the second wireless network 105 and attempt to connect to the first wireless network 101. For example, the second client device 130 may identify the access point 110 advertising (e.g., by a beacon or other advertisement) the capability to connect using networking profiles of the type now installed on the second client device 130. The second client device 130 may then associate with the access point 110 in an attempt to join the first wireless network 101. The second client device 130 may provide credentials or other information associated with the networking profile installed thereon. In operation 326, the access point 110 and/or the controller 150 may authenticate the provided credentials or other information, and if valid enable the second client device 130 to join the first wireless network 101.

In operation 328, and responsive to a notification that the second client device 130 has joined the first wireless network 101 successfully, the profile service 170 may associate the second client device 130 with the first client device 120 and/or with a user of the first client device 120. In some embodiments operation 328 may be performed as part of operation 320 or at any time subsequent thereto.

Optionally, in operation 330, and in response to an optional notification of the association of the second client device 130 with the first client device 120 and/or with a user thereof, the access point 110 and/or controller 150 may alter a property of a connection between the second client device 130 with the access point 110, or with a network (e.g., the external network 140-1) accessed via the first wireless network 101 and the access point 110. The alteration of the property may be based, for example, on a determination that the user has achieved a certain loyalty status and/or is entitled to a loyalty benefit or other benefit, such as increased connection bandwidth, increased priority, access to certain networking resources, etc. Accordingly, the user may be able to use the second client device 130 in a manner consistent with the entitled benefit.

Figure 12A:
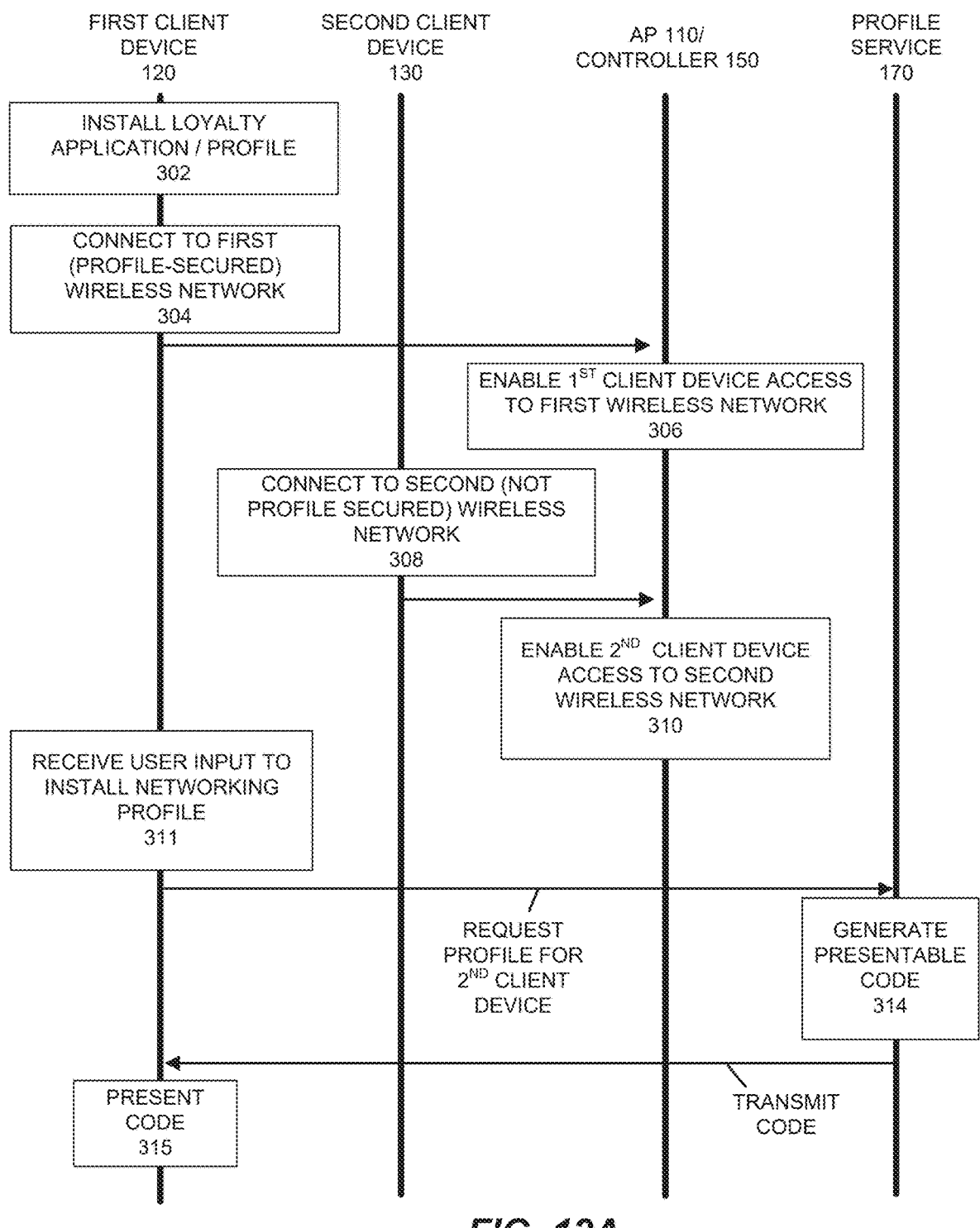
FIGS. 12A and 12B are diagrams illustrating operations and communications of the components of the networking system of FIG. 1 according to aspects of the present disclosure.
Figure 12B:
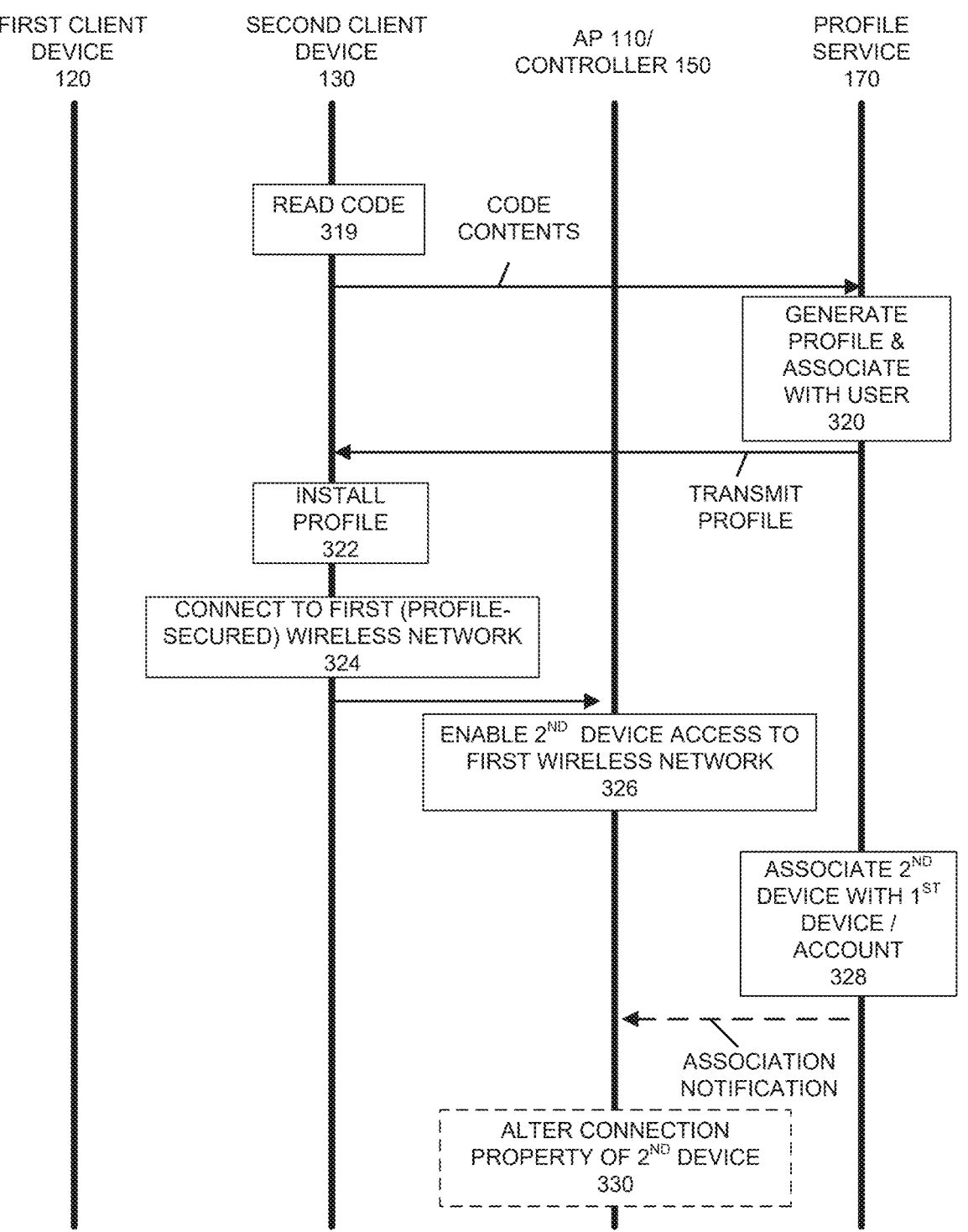

FIGS. 2A and 2B illustrate that the second client device 130 is used to present the code that is read by or inputted into the first client device 120, but in some embodiments the first client device 120 may be used to present the code that is read by or inputted into the second client device 130. For example, FIGS. 12A and 12B, are diagrams illustrating operations and communications of the components of the networking system 100 of FIG. 1 according to aspects of the present disclosure. FIG. 12A differs from FIG. 2A in that, in operation 311, the user input to install a networking profile on the second client device 130 may be received from the first client device 120, and that in operation 315, the code may be transmitted to and presented by the first client device 120 instead of the second client device 130. The first client device 120 may request a networking profile be generated for the second client device 130, and may provide the user and/or account identifier (e.g., associated with the mobile application 122). FIG. 12B differs from FIG. 2B in that, in operation 319, the code may be read by the second client device 130, which may transmit the code contents 130 to the profile service 170, and thereby request the generated networking profile 122.

Figure 3:
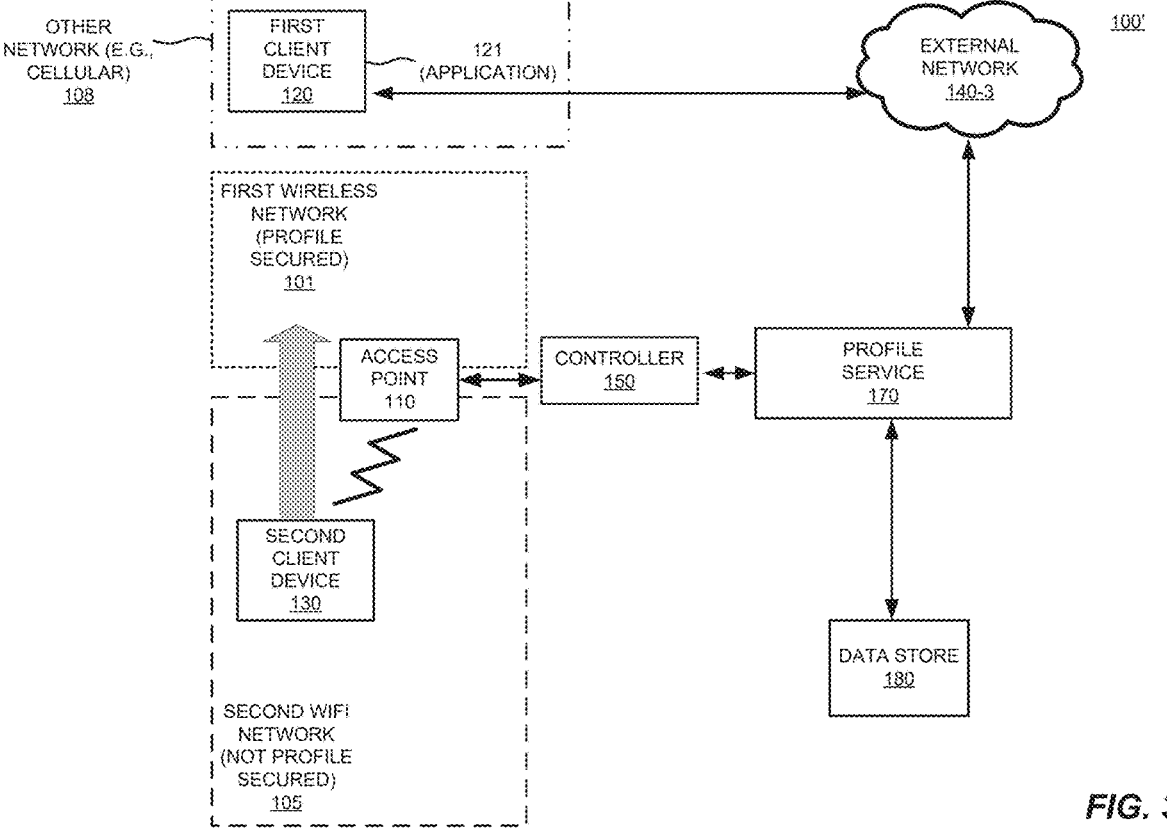
FIG. 3 is a block diagram illustrating an example of a networking system in which communication techniques according to aspects of the present disclosure may be implemented
Figure 4A:
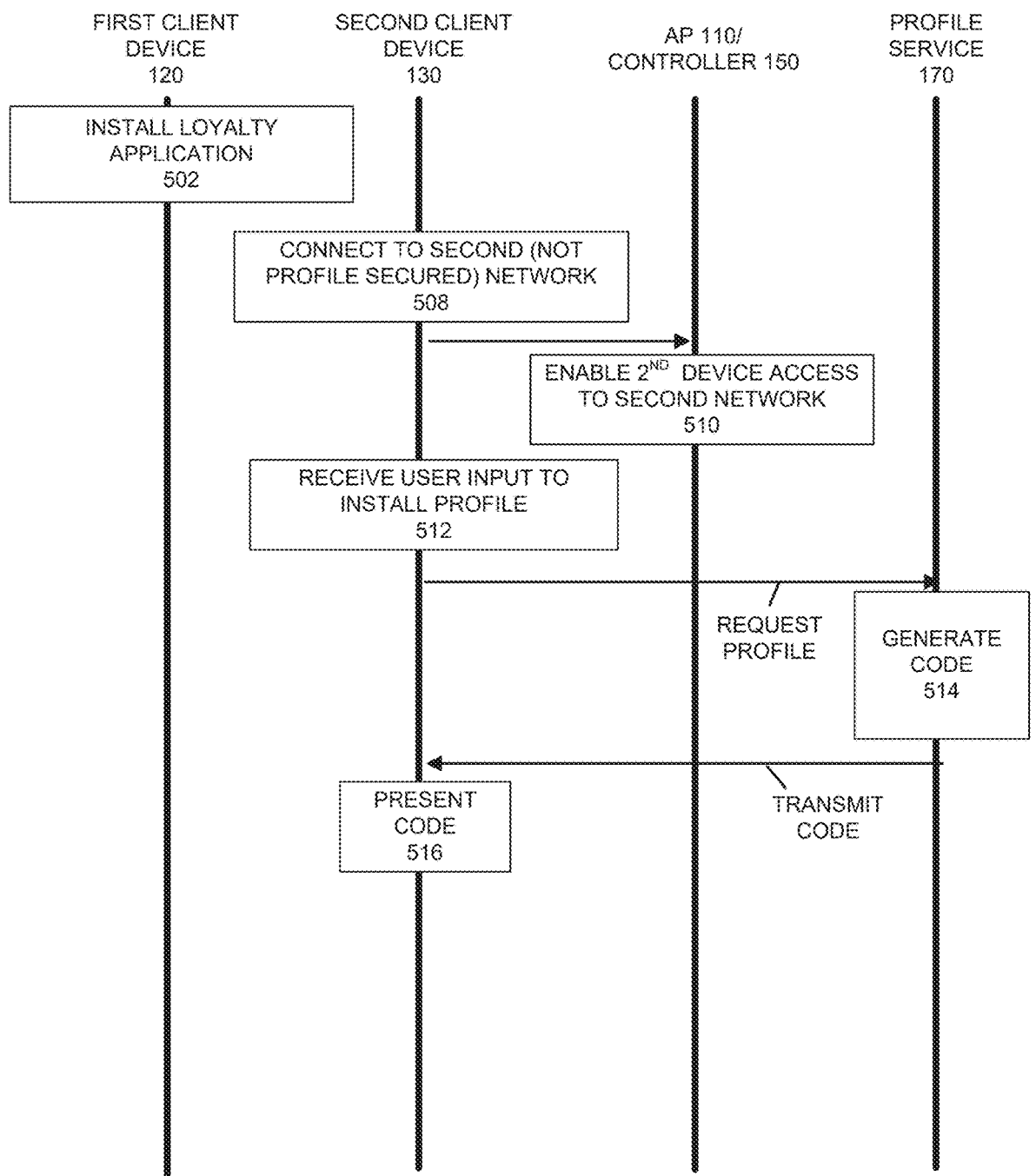
FIGS. 4A and 4B are diagrams illustrating operations and communications of the components of the networking system of FIG. 3 according to aspects of the present disclosure.
Figure 4B:
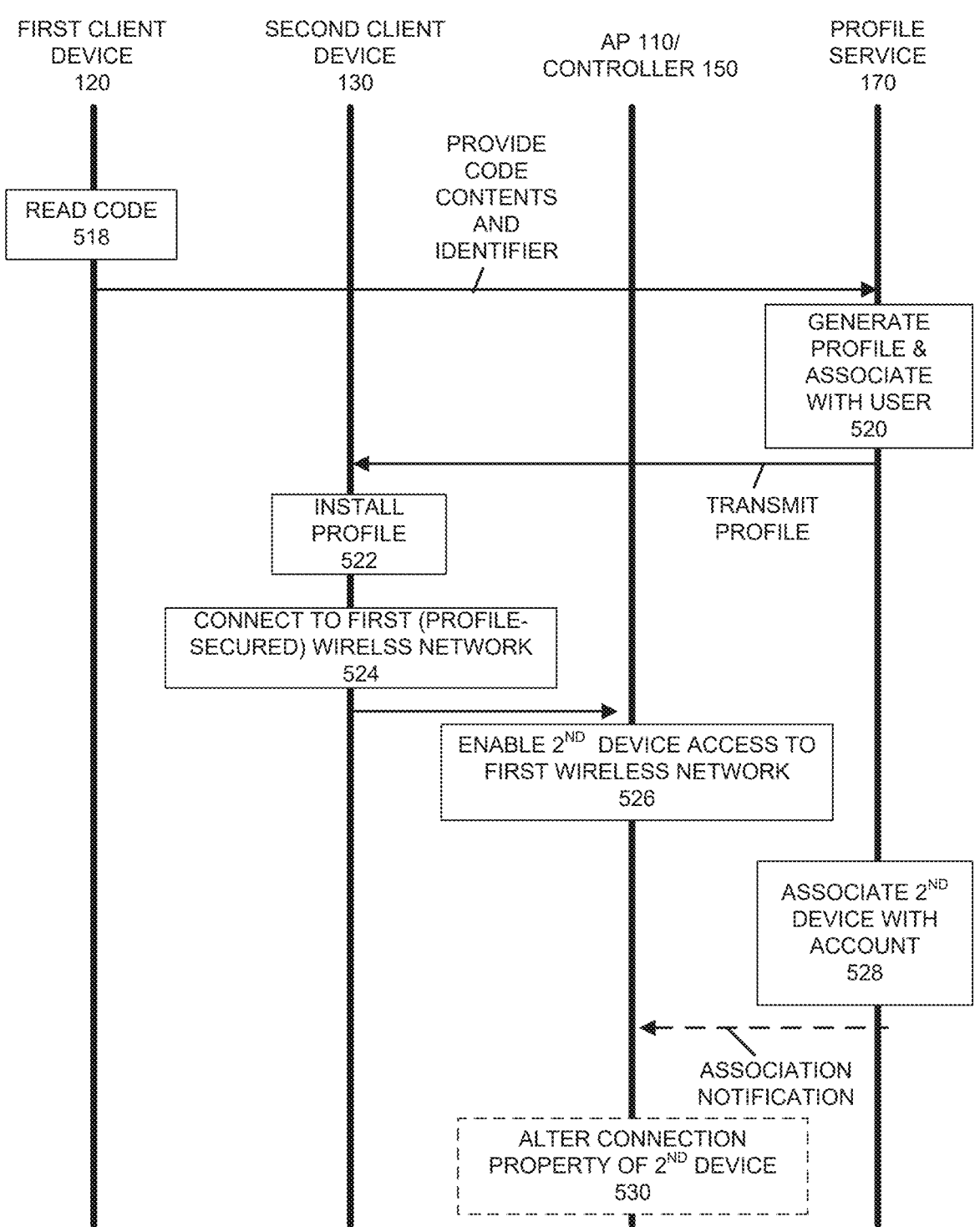

FIG. 3 is a block diagram illustrating an example of a networking system 100' providing wireless local area networks according to aspects of the present disclosure, and FIGS. 4A and 4B are diagrams illustrating operations and communications of the components of the system 100' of FIG. 3 according to aspects of the present disclosure. The networking system 100' of FIG. 3 may be similar to the networking system 100' of FIG. 1, and FIGS. 4A and 4B are similar respectively to FIGS. 2A and 2B, with a first difference being that instead of being connected to the first (profile secured) wireless network 101, the first client device 120 is connected to another network 108, which may be a cellular network, and a second difference being that the first client device 120 may have only the mobile application 121 installed thereon (and may or may not have the networking profile 122 installed and/or configured). Discussion of components of the networking system 100' of FIG. 3 similar to those of the networking system 100 of FIG. 1 is not repeated herein in the interest of brevity, and not all components of the networking system 100' are shown in FIG. 3 to simplify the drawing.

The profile service 170 may be accessible from the cellular or other network 108, for example via a third external network 140-3. Although the profile service 170 is shown as directly connected to the third external network 140-3, in some embodiments the profile service 170 may be in communication with the other network 108 and the first client device 120 via the controller 150 or other network devices.

In FIG. 4A, operation 502 may be similar to operation 302, in that a user may download and install onto the first client device 120 a mobile application 121. However, as discussed above, the mobile application 121 of FIG. 3 may or may not have bundled therewith a networking profile 122. In some embodiments, operation 502 may be performed prior to the user visiting a location at which the first wireless network 101 is offered. As can be seen, the first client device 120 does not necessarily need to connect to the first wireless network 101, and as such operations similar to operations 304 and 306 are optional and are omitted from FIG. 4A. Operations 508, 510, 512, 514, 516, 518, 520, 522, 524, 526, 528, and 530 of FIGS. 4A and 4B may be essentially similar to respective operations 308, 310, 312, 314, 316, 318, 320, 322, 324, 326, 328, and 330 of FIGS. 2A and 2B, taking into account that the networking profile may not be installed on the first client device 120 and may therefore not be a source of user or account information, and that the second client device 130 (or a networking profile 122 generated for the second client device 130) may be only associated with a user or loyalty account rather than with a networking profile of the first client device 120.

FIGS. 3, 4A, and 4B provide that, in some embodiments, a mobile application 121 installed on a first client device 120 may be a primary or sole source of information to generate a networking profile 122 for a second client device 130, and/or that the first client device 120 does not necessarily need to access or connect to the profile secured wireless network 101 to provide such information. This may facilitate generation and deployment of networking profiles for second client devices 130 and thereby provide more secure and improved wireless network access.

Figure 5:
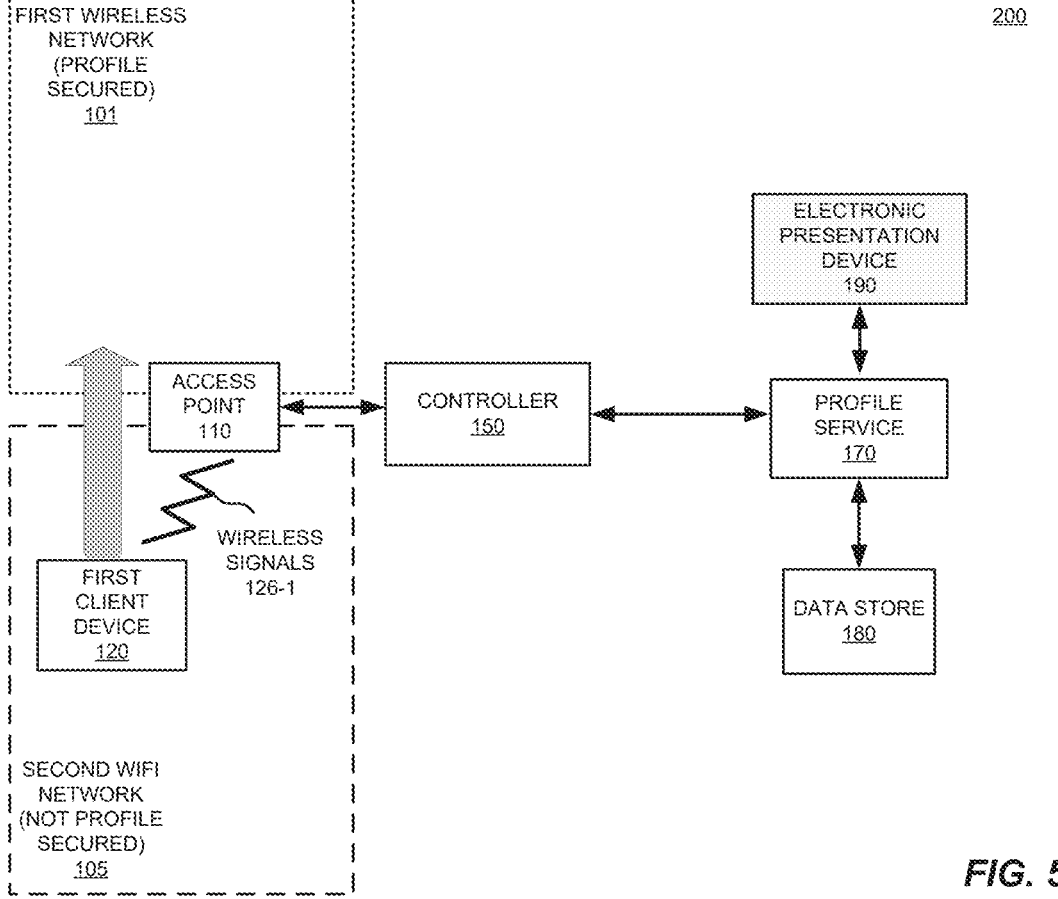
FIGS. 5 and 6 are block diagrams illustrating examples of networking system in which communication techniques according to aspects of the present disclosure may be implemented
Figure 6:
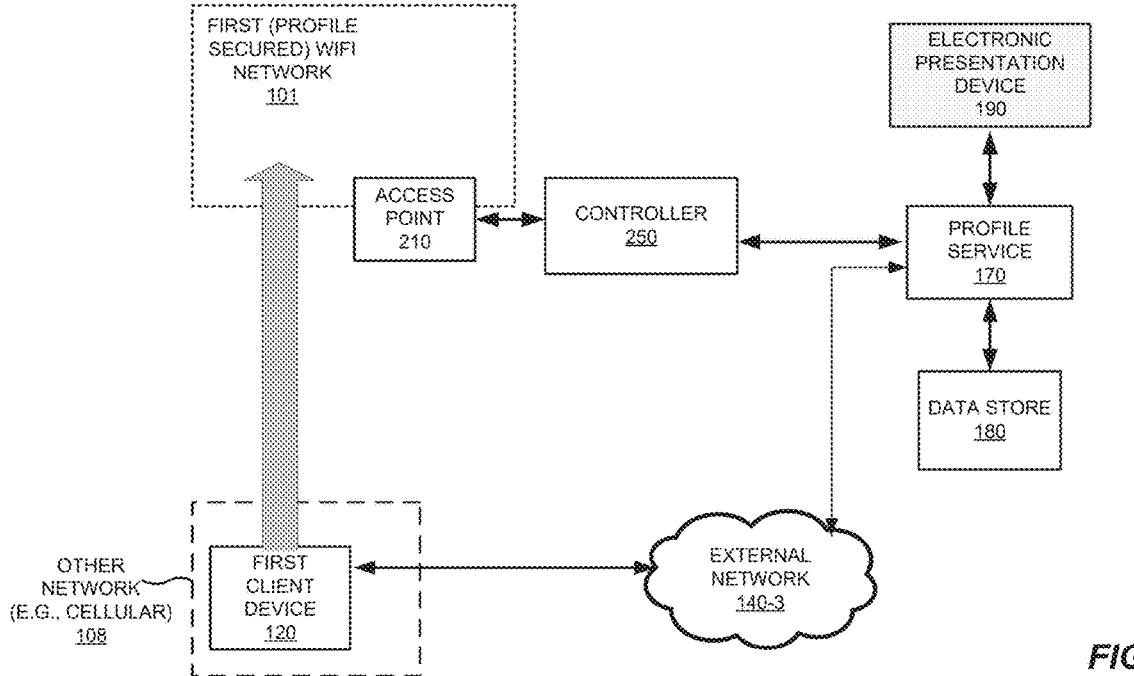

Aspects of the present disclosure also provide methods, systems, and devices for generating and installing networking profiles on a first client device 120, and thereby provide an easier way for a user to connect the first client device 120 device to the first (profile secured) wireless network 101. For example, the user may arrive at the vendor and may have not previously installed either the mobile application 121 or a networking profile 122. Although the user may download the mobile application 121 (and the networking profile 122 bundled therein) onto the first client device 120, the user may then need to register or create an account. This may require the user to provide their personal information twice to the vendor: once as part of a check-in or reservation process, and again as part of creating an account for the mobile application 121. FIGS. 5 and 6 are block diagrams illustrating example of networking systems 200 and 200' providing wireless local area networks according to aspects of the present disclosure. Some discussion of components described previously with respect to FIGS. 1 and 3 is not repeated herein in the interest of brevity.

The networking systems 200 and 200' may include an electronic presentation device 190, which may be provided by a vendor, e.g., a hospitality vendor. For example, the electronic presentation device 190 may be an in-room television, kiosk, or other display device (e.g., tabletop or wall-mounted LCD display) available at a location associated with the vendor (e.g., cash register, front desk, check-in kiosk, bell stand, or the like). The electronic presentation device 190 may be configured to present the code (e g., machine readable code, bar code, QR code) discussed above with respect to FIGS. 1, 2A, and 2B. FIGS. 5 and 6 differ from each other in that in FIG. 5, the first client device 120 may be initially connected to the second (not profile secured) wireless network 105, and in FIG. 6, the first client device 120 may be connected initially to an other network (e.g., cellular network) 108.

Figure 7A:
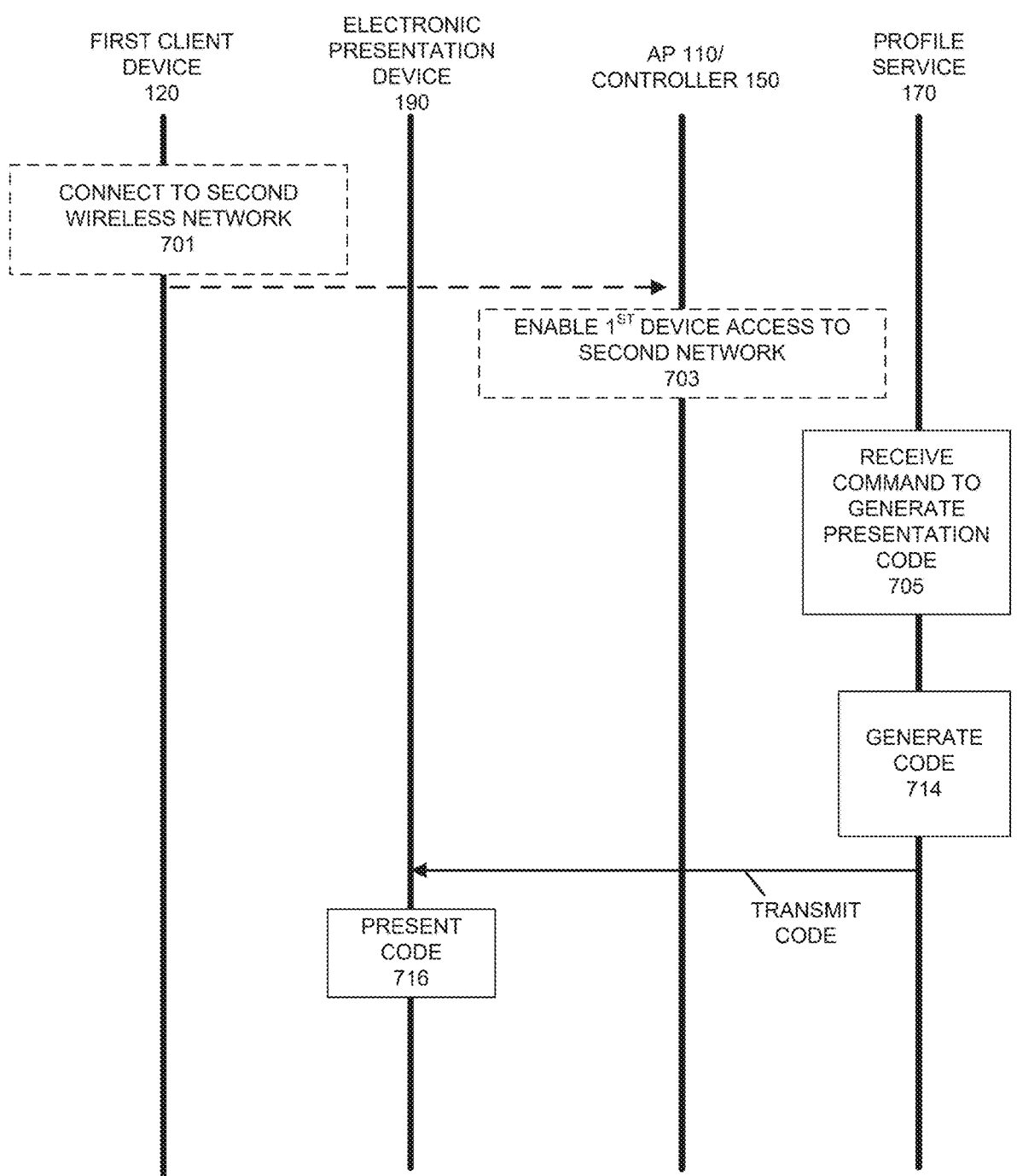
FIGS. 7A and 7B are diagrams illustrating operations and communications of the components of the networking systems of FIGS. 5 and 6 according to aspects of the present disclosure.
Figure 7B:
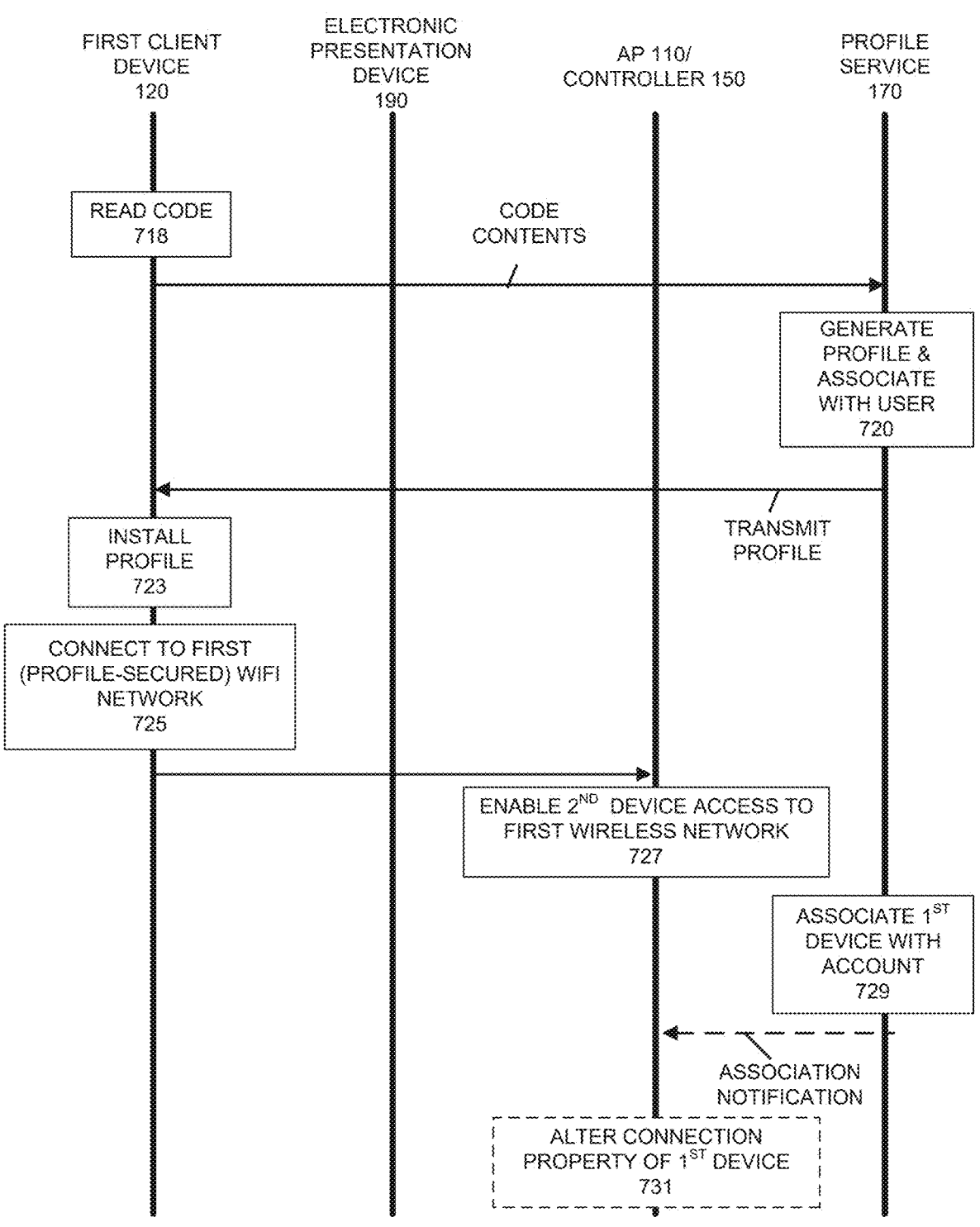

FIGS. 7A and 7B are diagrams illustrating operations and communications of the components of the networking systems 200, 200' of FIGS. 5 and 6 according to aspects of the present disclosure. Operations 701 and 703 are shown with particular applicability to FIG. 5, and the remaining operations of FIGS. 7A and 7B are applicable to the systems 200 and 200' of both FIGS. 5 and 6.

In operation 701, the user may configure or control the first client device 120 to associate with an access point 110 in an attempt to join the second wireless network 105, which as discussed above may be an open and unsecured wireless network, or a wireless network secured by a pre-shared key. In operation 703, the access point 110 and/or the controller 150 may enable the first client device 120 to join the second wireless network 105, which may include the access point 110 and/or controller 150 authenticating any pre-shared key or other access credential provided. As such, the first client device 120 may be connected to the second (not profile secured) wireless network 105.

In operation 705, the profile service 170 may receive a command to generate a machine readable code that may be used to generate a networking profile 122 for installation on the first client device 120. For example, as a part of joining the second wireless network 105, a command to generate a machine readable code that is used to generate a networking profile 122 may be transmitted during a check-in, check-out, registration, or other process. For example, during a hotel check-in process, a hotel registration system may transmit the command to the profile service 170. As another example, during a check-out process at a restaurant or cafe, a point of sale system may transmit the command to the profile service. As yet another example, user input (such as pressing a button on a kiosk or other presentation device 190) may be solicited by way of an advertisement or other user interface. The advertisement or user interface may discuss the benefits of networking profiles and/or indicating that access to some networking resources will not permitted only via the second wireless network 105 (and hence, only if a networking profile is installed).

The command transmitted to the profile service 170 to generate the code may include or be accompanied by one or more identifiers of a user or user account. For example, the first client device 120 may transmit an account identifier or other identifier of a user identified during the check-in, check-out, registration, or other process. The identifier may be obtained from, e.g., the data store 180.

In response to the code generation command, the profile service 170 may generate the code to be presented in operation 714 and transmit the code and/or instructions to present the code to the electronic presentation device 190. In some embodiments, the command to generate the code received in operation 705 may indicate the electronic presentation device 190 (e.g., the command may indicate a room number or other locator associated with the user). The machine-readable code for presentation on a presentation device (e.g., display device, auditory device) associated with the request for the networking profile 122.

The code contents and/or instructions to display or present the code contents may be transmitted to the electronic presentation device 190, which may display or present the code in operation 716. Turning now to FIG. 7B, in operation 718 the code contents may be read (or in some embodiments inputted by the user) into the first client device 120. In operation 720, the profile service 170 may receive the code contents from the first client device 120, and using the code contents associate the first client device 120 with the information received in or accompanying the command to generate the code. The profile service 170 may use the provided user or account identifier to generate a networking profile for the first client device 120. In some embodiments, the profile service 170 may use the user or account identifier to obtain information from the data store 180. The profile service 170 may provide the generated networking profile to the first client device 120. For example, the profile service 170 may transmit the networking profile or a URL from which the networking profile may be obtained.

In some embodiments, the generation in operation 714 of the code for presentation may be performed concurrently with the generation of the networking profile 122 in operation 720. Thus, in some embodiments, the presented code may provide, or may instead provide, a location or URL from which the generated networking profile 122 may be downloaded. However, in some embodiments the code for presentation may be generated independently of the networking profile 122, and the networking profile 122 may be generated only if requested (e.g., only if the contents of the code are received at the profile service 170 from the first client device 120), for example to avoid excessive generation of networking profiles 122 that are not retrieved and installed.

In operation 723, the first client device 120 may obtain and install the networking profile 122. In operation 725, the first client device 120 may disconnect from the second wireless network 105, if previously connected, and attempt to connect to the first wireless network 101. For example, the first client device 120 may identify the access point 110 advertising (e.g., by a beacon or other advertisement) the capability to connect using networking profiles of the type now installed on the first client device 120. The second client device 120 may then associate with the access point 110 in an attempt to join the first wireless network 101. The first client device 120 may provide credentials or other information associated with the installed networking profile 122. In operation 727, the access point 110 and/or the controller 150 may authenticate the provided credentials or other information, and if valid enable the first client device 120 to join the first wireless network 101.

In operation 729, and responsive to an indication that the first client device 120 has successfully joined the first wireless network 101, the profile service 170 may associate the first client device 120 with an account of the user. In some embodiments operation 729 may be performed as part of operation 720 or at any time subsequent thereto.

Optionally, in operation 731, and in response to the association of the first client device 120 with a user account, the access point 110 and/or controller 150 may alter a property of a connection between the first client device 120 with the access point 110, or with a network accessed via the access point 110. As discussed above, the alteration of the property may be based, for example, on a determination that the user has achieved a certain loyalty status and/or is entitled to a loyalty benefit or other benefit, such as increased connection bandwidth, increased priority, access to certain networking resources, etc. Accordingly, the user may be able to use the first client device 120 in a manner consistent with the entitled benefit.

Figure 9:
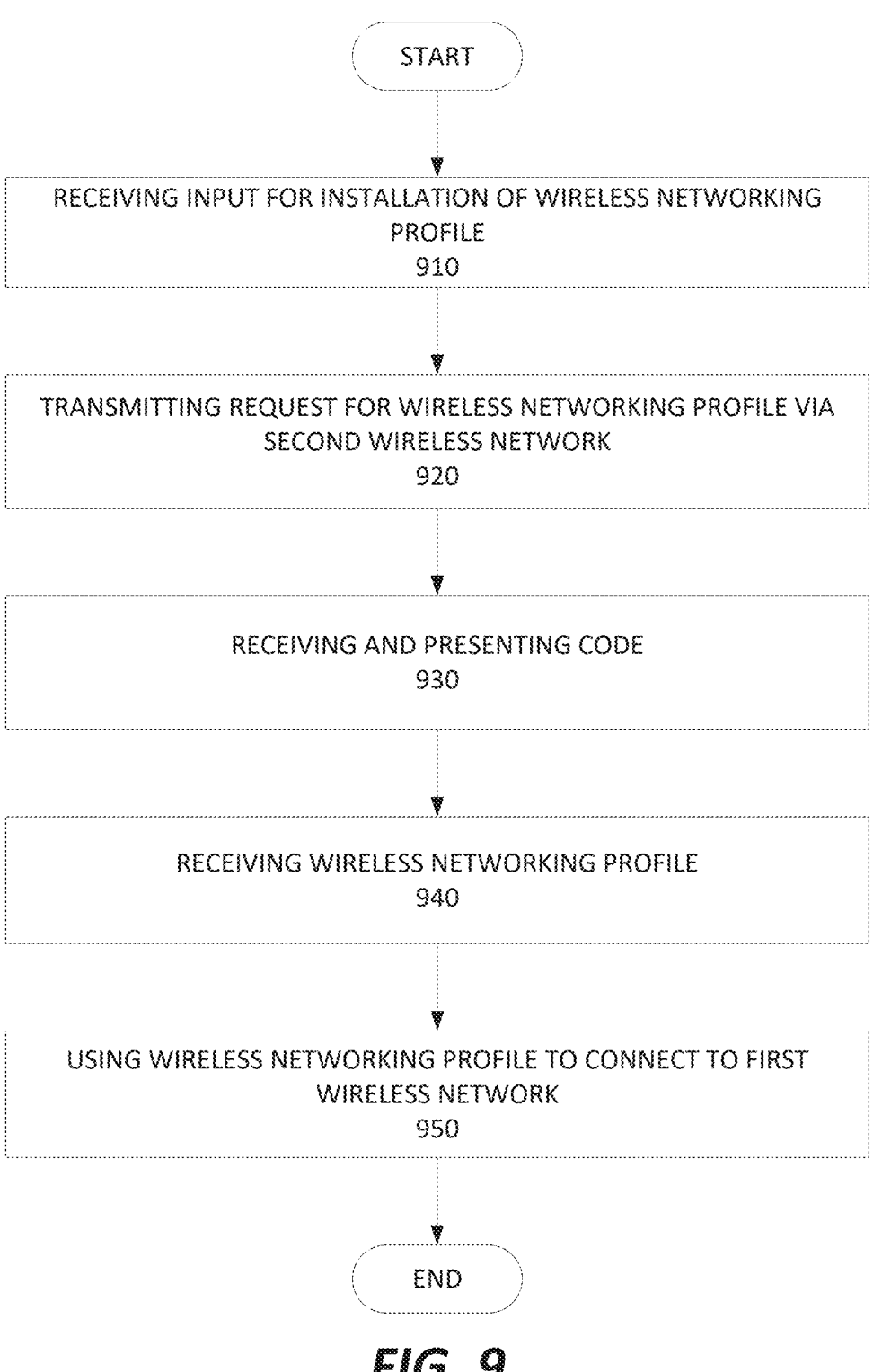
Figure 10:
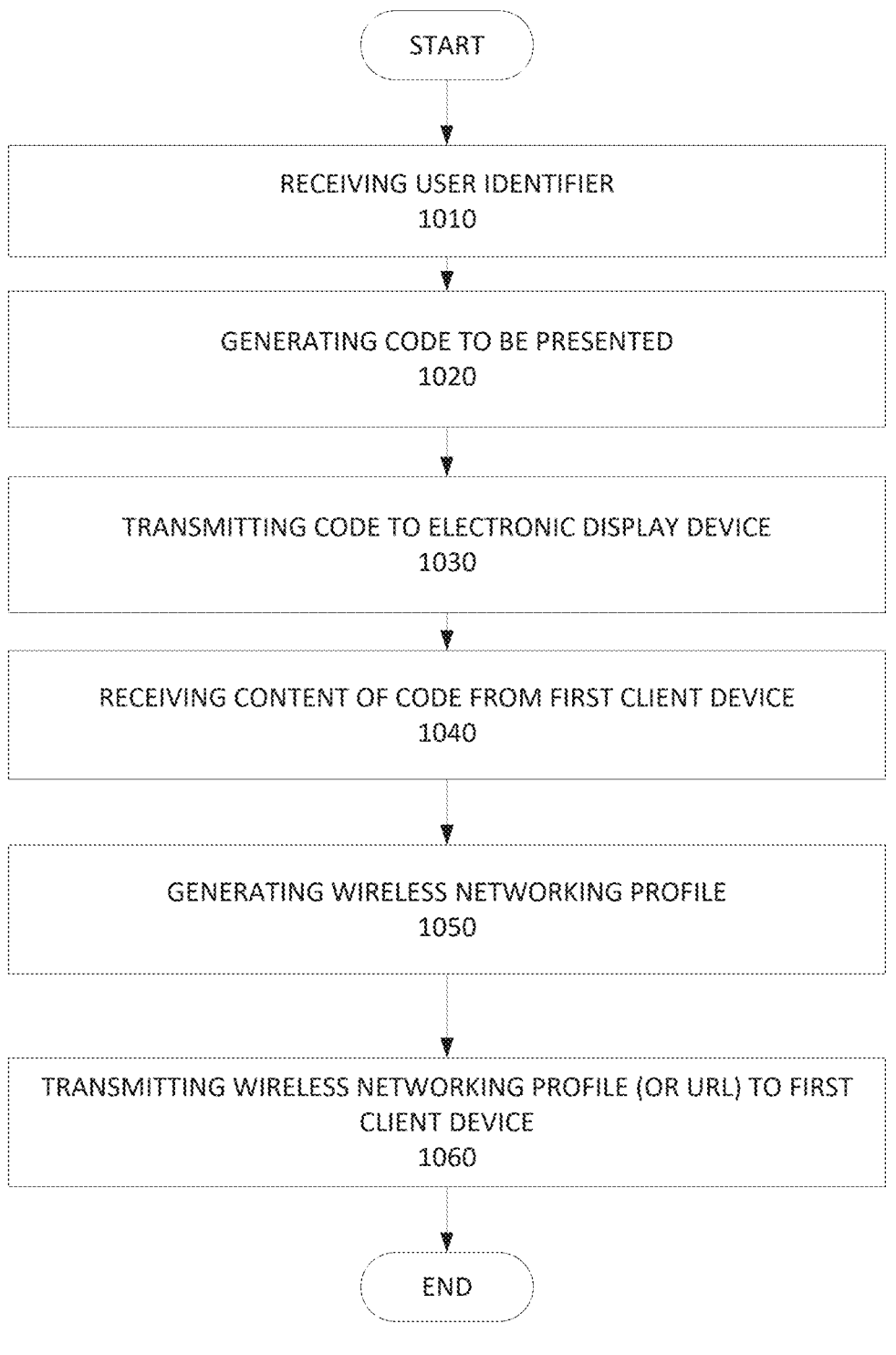

With reference to FIGS. 1-7, it may be seen that several methods, systems, and devices are described herein. For example, FIGS. 8-10 are flow charts illustrating methods for deployment of profiles for use in connecting to wireless local area networks according to aspects of the present disclosure, with the understanding that the present disclosure is not limited to the methods explicitly illustrated in the figures.

Figure 8:
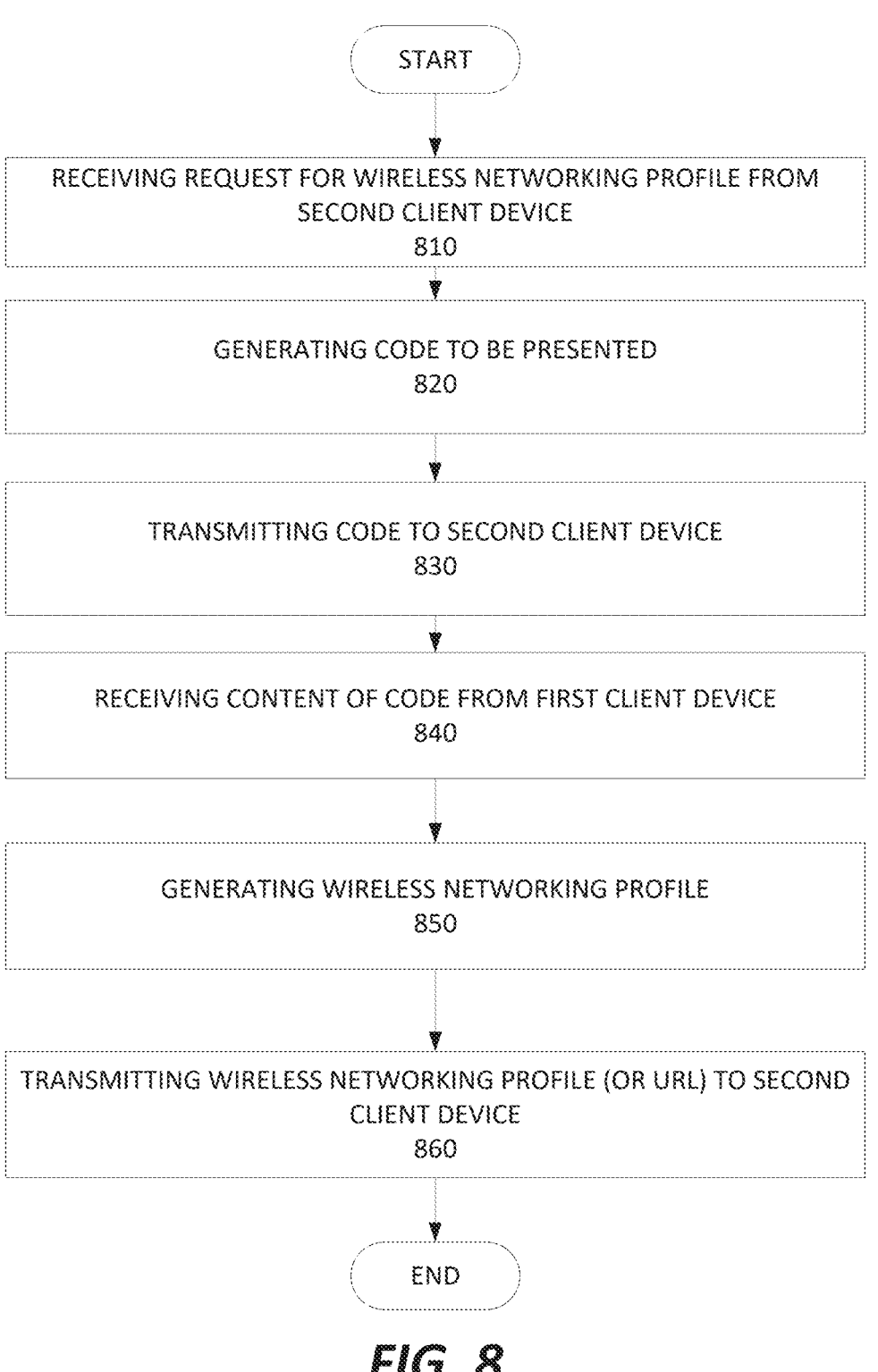
FIGS. 8-10 are flow charts illustrating methods for deployment of profiles for use in connecting client devices to wireless local area networks according to aspects of the present disclosure.

As seen in FIG. 8, in some embodiments, a method of deploying a networking profile may include receiving a request for the networking profile from a second computing device (block 810). The second computing device may be, e.g, the second client device 130 discussed above. The networking profile may be the networking profile 122 discussed above, with the networking profile configured to enable the second computing device to access to a wireless network. The networking profile may be a Passpoint profile.

The method may further include generating, based on the received request for the networking profile, a code for presentation (block 820), such as the code for visual presentation discussed above, and transmitting the code for presentation to the second computing device (block 830). An indication of a content of the code for presentation may be received from a first computing device different than the second computing device (block 840). The first computing device may be the first client device 120 discussed above. The networking profile may be generated based on receiving the indication of the content of the code for presentation (block 850); and the generated networking profile may be transmitted to the second computing device (block 860).

In some embodiments, the method may include receiving a user identifier that identifies a user or an account of the user, and the generating of the network profile is further based on the user identifier. For example, the user identifier may be received from the first computing device, either as part of a single transmission in which the content of the code for presentation is received, or as part of a different transmission.

As discussed above, the wireless network that the networking profile is configured to enable the second computing device to access to may be a first wireless network (e.g., wireless network 101), and the request for the networking profile may be received via a second wireless network (e.g., wireless network 105) that is different from the first wireless network. The code for presentation may be transmitted to the second computing device via the second wireless network. The indication of the content of the code for presentation may be received via the first wireless network. An access point (e.g., access point 110) may provide service to both the first wireless network and the second wireless network.

In some embodiments, the transmitting of the generated network profile to the second computing device comprises transmitting a uniform resource locator (URL) identifying a location from which the generated networking profile can be accessed.

Another example of a method provided by the present disclosure may be seen in FIG. 9. In some embodiments, a method of connecting to a first wireless network may include receiving, e.g., by a computing device, user input requesting installation of a networking profile (block 910). The networking profile (e.g., the networking profile 122) may be configured to secure access to the first wireless network. A request for the networking profile may be transmitted via a second wireless network that is different from the first wireless network (block 920). A code associated with the request for the networking profile may be received and presented by the computing device (block 930). The networking profile may be obtained (block 940); and the networking profile may be used to connect to the first wireless network (block 950).

In some embodiments, obtaining the networking profile may include receiving a uniform resource locator (URL) identifying a location from which the networking profile can be accessed and the networking profile may be obtained from the URL-identified location.

FIG. 10 illustrates another method according to the present disclosure that may be used to generate and deploy a networking profile to a first client device According to some aspects of the present inventive concepts, a method may include: receiving a user identifier (block 1010) and generating, based on the user identifier, a code for presentation by an electronic presentation device (block 1020). The electronic display device may be the electronic presentation device 190 shown in FIGS. 5 and 6. The code for presentation may be transmitted to the electronic presentation device (block 1030). A content of the code may be received, from the first client device (block 1040). Based on the receiving of the content of the code and based on the user identifier, a networking profile may be generated for the first client device (block 1050). The networking profile is configured to enable the first client device to join a wireless network. The networking profile may be transmitted to the first client device (block 1060).

In some embodiments, the transmitting of the generated network profile to the first client device my include transmitting a uniform resource locator (URL) identifying a location from which the generated networking profile can be accessed. In some embodiments, the user identifier may be received from a hotel reservation management system or any other computing device or system. In some embodiments, the electronic presentation device may be a television.

In some embodiments, the wireless network that the networking profile is configured to enable the first client device to join to is a first wireless network, and the content of the code is received via a second wireless network that is different from the first wireless network.

Figure 11:
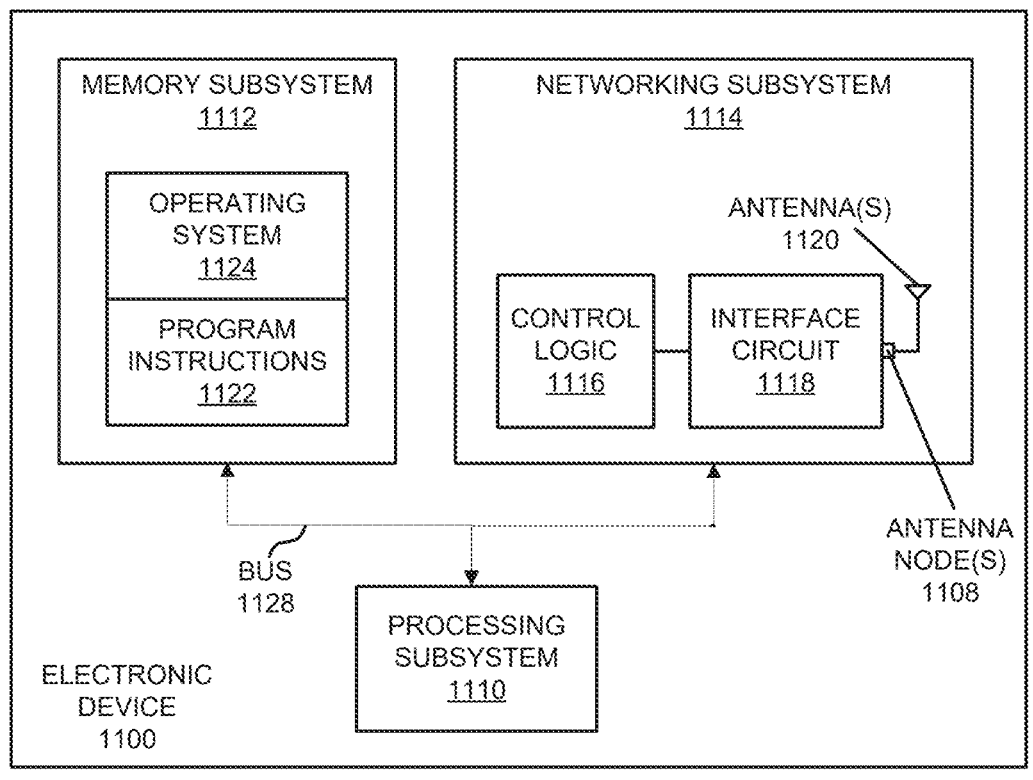
FIG. 11 is a block diagram of an electronic device (e.g., an access point or a client device) according to embodiments of the present inventive concepts.

FIG. 11 is a block diagram illustrating an electronic device 1100 in accordance with some embodiments. The electronic device 1100 may be, for example, one of the access points, one of the client devices, one of the electronic presentation devices, or so on that is illustrated in and described with reference to FIG. 1, 3, 5, or 6. The electronic device 1100 includes a processing subsystem 1110, a memory subsystem 1112, and a networking subsystem 1114. Processing subsystem 1110 includes one or more devices configured to perform computational operations. Memory subsystem 1112 includes one or more devices for storing data and/or instructions. In some embodiments, the instructions may include an operating system and one or more program modules which may be executed by processing subsystem 1110.

Networking subsystem 1114 includes one or more devices configured to couple to and communicate on a wired and/or wireless network (i.e., to perform network operations), including: control logic 1116, an interface circuit 1118 and one or more antennas 1120 (or antenna elements). While FIG. 11 includes an antenna 1120, in some embodiments electronic device 1100 includes one or more nodes, such as nodes 1108, e.g., a connector, which can be coupled to one or more antennas 1120 that are external to the electronic device 1100. Thus, electronic device 1100 may or may not include the one or more antennas 1120. Networking subsystem 1114 includes at least a networking system based on the standards described in IEEE 802.11 (e.g., a Wi-Fi networking system).

Networking subsystem 1114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1100 may use the mechanisms in networking subsystem 1114 for performing simple wireless communication between the electronic devices, e.g., transmitting frames and/or scanning for frames transmitted by other electronic devices.

Processing subsystem 1110, memory subsystem 1112, and networking subsystem 1114 are coupled together using bus 1128. Bus 1128 may include an electrical, optical, and/or electro-optical connection that the subsystems can use to communicate commands and data among one another.

Electronic device 1100 can be (or can be included in) any electronic device with at least one network interface. For example, electronic device 1100 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

The operations performed in the communication techniques according to embodiments of the present inventive concepts may be implemented in hardware or software, and in a wide variety of configurations and architectures. For example, at least some of the operations in the communication techniques may be implemented using program instructions 1122, operating system 1124 (such as a driver for interface circuit 1118) or in firmware in interface circuit 1118. Alternatively or additionally, at least some of the operations in the communication techniques may be implemented in a physical layer, such as hardware in interface circuit 1118.

Embodiments of the present inventive concepts have been described above with reference to the accompanying drawings, in which embodiments of the inventive concepts are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

What is claimed is:

1. A method of operating an electronic device including a processing subsystem, comprising:

receiving a request for a networking profile from a second computing device, the networking profile configured to enable the second computing device to join a wireless network;

generating, based on the received request for the networking profile, a code for presentation;

transmitting the code for presentation to the second computing device;

receiving an indication of a content of the code for presentation from a first computing device different than the second computing device;

generating the networking profile based on receiving the indication of the content of the code for presentation; and transmitting the generated networking profile to the second computing device.

2. The method of claim 1, further comprising receiving a user identifier that identifies a user or an account of the user, wherein the generating of the network profile is further based on the user identifier.

3. The method of claim 2, wherein the user identifier is received from the first computing device.

4. The method of claim 1, wherein the wireless network that the networking profile is configured to enable the second computing device to join is a first wireless network, and wherein the request for the networking profile is received via a second wireless network that is different from the first wireless network.

5. The method of claim 4, wherein the code for presentation is transmitted to the second computing device via the second wireless network.

6. The method of claim 4, wherein the indication of the content of the code for presentation is received via the first wireless network.

7. The method of claim 4, wherein a first access point services both the first wireless network and the second wireless network.

8. The method of claim 1, wherein the transmitting of the generated network profile to the second computing device comprises transmitting a uniform resource locator (URL) identifying a location from which the generated networking profile can be accessed.

9. The method of claim 1, wherein the code for presentation is a quick response (QR) code or barcode.

10. The method of claim 1, wherein the generated network profile is a Passpoint profile.

11. A method of operating an electronic device including a processing subsystem, comprising:

receiving a user identifier;

generating, based on the user identifier, a code for presentation by an electronic presentation device;

transmitting the code for presentation to the electronic presentation device;

receiving, from a first client device, a content of the code;

generating, based on the receiving of the content of the code and based on the user identifier, a networking profile for the first client device, wherein the networking profile is configured to enable the first client device to join a wireless network; and transmitting the networking profile to the first client device.

12. The method of claim 11, wherein the transmitting of the generated network profile to the first client device comprises transmitting a uniform resource locator (URL) identifying a location from which the generated networking profile can be accessed.

13. The method of claim 11, wherein the user identifier is received from a hotel reservation management system.

14. The method of claim 11, wherein the electronic presentation device is a television.

15. The method of claim 11, wherein the wireless network that the networking profile is configured to enable the first client device to join to is a first wireless network, and wherein the content of the code is received via a second wireless network that is different from the first wireless network.

16. The method of claim 11, wherein the content of the code is received via a cellular network.

17. The method of claim 11, wherein the code for presentation is a quick response (QR) code or barcode.

18. The method of claim 11, wherein the networking profile is a Passpoint profile.

19. A method of operating an electronic device including a processing subsystem, comprising:

receiving user input requesting installation of a networking profile, the networking profile configured to secure access to a first wireless network;

transmitting a request for the wireless networking profile via a second wireless network different from the first wireless network;

receiving and presenting a code associated with the request for the networking profile;

obtaining the networking profile; and using the networking profile to connect to the first wireless network.

20. The method of claim 19, wherein obtaining the networking profile comprises:

receiving a uniform resource locator (URL) identifying a location from which the networking profile can be accessed; and obtaining the networking profile from the URL-identified location.

* * * * *